DIGITAL SERVO AND INCREMENTAL POSITIONER

Filed July 20, 1962

INVENTOR.
THOMAS J. PRICE
BY
S. J. Rotondi, A. J. Dupont & S. Dubroff
ATTORNEYS.

3,219,895
DIGITAL SERVO AND INCREMENTAL POSITIONER

Thomas J. Price, Cornwells Heights, Pa., assignor to the United States of America as represented by the Secretary of the Army
Filed July 20, 1962, Ser. No. 211,460
3 Claims. (Cl. 318—28)
(Granted under Title 35, U.S. Code (1952), sec. 266)

Figures 1, 2:
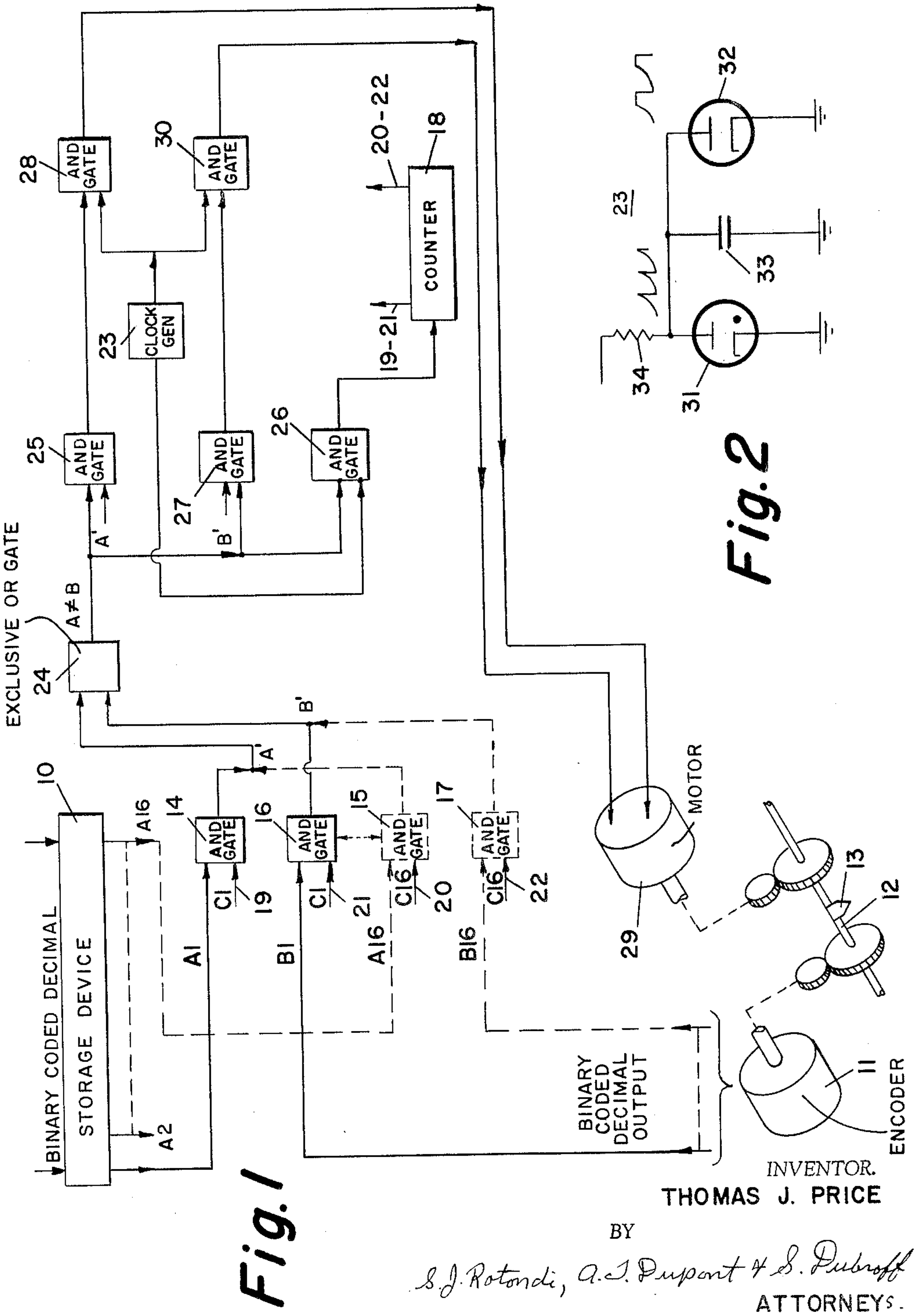

The invention described herein may be manufactured and used by or for the Government for governmental purposes without the payment to me of any royalty thereon.

This invention relates to curve plotting devices or systems such as are controlled by a series of stored digit-representative voltages to position an indicating or recording element in accordance with the number expressed by said digits.

Curve plotting systems heretofore available have usually utilized an analog computer to store the potentials which represent the X and Y coordinates of the curve. Operation of these analog systems has not been altogether satisfactory for the reason that their components must be kept within close tolerances, their power supply must be highly stabilized, and provisions must be made to compensate for the ambient conditions under which they are operated. The present invention avoids these difficulties by the provision of a plotting system wherein the digit-representative potentials or control data are established in a storage device and are compared with controlled potentials or data which are indicative of the rotational position of a shaft which positions the indicating or recording element. When the controlled data conforms to the control data, the indicating or recording element is at the exact coordinate indicated by the stored control data.

The invention will be better understood from the following description when considered in connection with the accompanying drawings and its scope is indicated by the appended claims.

Referring to the drawings:

FIG. 1 is a wiring diagram of so much of the system as is involved in the plotting of one coordinate of a curve. The arrangement for plotting the other coordinate is similar, and, FIG. 2 is a schematic circuit diagram of a suitable form of clock-generator.

The system of FIG. 1 includes a storage device 10 in which control data is stored from a computer or keyboard (not shown). For purpose of illustration, this data is hereinafter assumed to consist of four decimal digits (0000 to 9999) coded in binary coded decimal (BCD). This results in sixteen bits of control data per coordinate. Compared with and conformed to these sixteen bits of control data are sixteen bits of controlled data all generated by an encoder 11 and each representative of a different rotational position of a shaft 12 to which the encoder 11 is geared. An indicator or recording element 13 fixed to the shaft 12 is positioned in accordance with the bits of data stored in the device 10. In FIG. 1, the controlling bits of data are indicated by the reference letters Al to Al6 and the controlled bits of data are indicated by the reference letters Bl to Bl6.

The sixteen bits of controlling data are each applied, as a voltage, to one input terminal of a different one of sixteen "and" gates, all but the first, 14, and the last, 15, of which have been omitted in order to simplify the drawing. Similarly the sixteen bits of controlled data are each applied to one of the input terminals of a different one of sixteen gates. All but the first 16, and the last 17, have been omitted. These two groups of gates have second input terminals 19, 20, 21 and 22 which are connected to a counter 18. The counter 18 operates under the control of a clock generator 23 to open corresponding gates of the two groups simultaneously. Thus gates 14 and 16 are opened at the same time, gates 15 and 17 are opened at the same time and the other pairs of gates are similarly opened by pulses applied from the counter 18. These pairs of corresponding gates are opened successively beginning with the gates 14 and 16 and ending with gates 15 and 17. After that, a new value of the coordinate is stored in the device 18 and the operation is repeated.

The outputs A′ and B′ of the gates 14 and 16, and the groups indicated, are applied to the input of a gate 24 which is an "exclusive Or" gate. All the other gates of the system are "and" gates and thus have two input circuits. The gate 24 (1) delivers a zero output when its inputs from gates 14 and 16 are equal, that is both zero or both one, (2) delivers an output by which a gate 25 is opened and a gate 26 is closed when the output of gate 14 is greater than that of gate 16, as when A is one and B is zero for example, and (3) in the same manner delivers a similar output by which a gate 27 is opened and the gate 26 is closed when the output of gate 16 is greater than that of gate 14, as when A is zero and B is one.

As is known, an "exclusive Or" gate, as here at 24, has two input connections and one output connection. The four possible input combinations and resultant outputs, stated in the known Boolean equations therefore, show that this type of gate permits the output to be a one only when the A or the B input, that is not both, are a one. When both are a one or a zero, the output is a zero, as above noted.

In this operation, assuming A is one, and B is zero, the gate 24 thus supplies a one output to the gates 25, 27 and 26. This is arranged to inhibit or close the "and" gate 26 and to open the "and" gate 25 noted. The "and" gate 27 is closed since the other input connection is zero, also as noted hereinafter. The output of the gate 25 will indicate that B is smaller than A when it is applied to the gate 28 along with the clock pulses.

When the gate 25 is open, as above, the counter 18 is inactivated by the closing of the gate 26 and the gate 28 is thus opened by the output of the gate 25. Under these conditions, the clock generator 23 applies voltage pulses to an incremental drive motor 29 by which this motor is driven in a direction to raise the output of the gate 16 to the same value as that of the gate 14. At this time, the indicator 13 is positioned in accordance with the most significant digit of the number stored in the storage device 10, and the output of the gate 24 is zero. Thereupon the gate 25 closes, the gate 26 opens and the clock generator 23 functions through the counter 18 to open the next successive pair of corresponding gates.

When the gate 27 is open, the counter 18 is inactivated by closing of the gate 26 and a gate 30 is opened by the output of the gate 27. Thereupon the clock generator 23 applies to the motor 29 pulses whereby this motor is driven in a direction to lower the output of the gate 16 to a value equal to that of the gate 14. At this time, the indicator 13 is positioned in accordance with the most significant digit of the number from the computer stored in the storage device 10, and the output of the gate 24 is zero so that the counter is put under control of the clock generator 23 as previously indicated.

Assuming a desired coordinate value of 4562 to be set up in the storage device 10 and the encoder 11 to be set at a value of 4163, these two values appear in binary coded decimal as 0100 0101 0110 0010 and 0100 0001 0110 0011

In this system, the most significant bits of data are at the left, both the value set up in the computer and that existing in the encoder starting with a zero. At the count of one, the gates 14 and 16 are opened by a pulse delivered from the counter 18. Since the inputs to these two gates are equal, both being zero, the gate 24 remains closed, and the counter 18 opens the next pair of corresponding gates at the count of two. This situation persists until the count of six is reached when the outputs of the sixth pair of corresponding A and B gates are one and zero.

As a result of this difference in the outputs of this sixth pair of corresponding gates, the gate 24 opens and delivers a one output whereby the gate 25 is opened and the gate 26 is closed. Closure of gate 26 interrupts the circuit between the clock generator 23 and the counter 18 thereby inactivating the counter. Opening of gate 25 produces an output which opens the gate 28 and connects the generator 23 to the motor 29. As a result, the shaft 12 and the encoder 11 are rotated in a direction to raise the output of the gate 16 to the same value as that of the output of gate 14. When this is accomplished, gates 24, 25 and 28 close and gate 26 opens. Closure of gates 24, 25 and 28 interrupts the connection between the clock generator 23 and the motor 29 and stops the motor. Opening of gate 26 connects the clock generator 23 to the counter 18 which is now restarted at the count of seven.

At this point, the situation changes due to corrective drive of the shaft 12. Such drive alters some of the less significant bits so that comparison and correct shaft position must be established in decending bit order. Exemplifying this in connection with the above defined problem, the position of shaft 12 has remained at the initial condition 0100 0001 0110 0011
↑
(6)

for weighing and comparing up to bit 6. At this time, there is a corrective drive to the shaft 12 so that bit 6 is not equal to the input value, but the following least significant values have been disturbed by virtue of the shaft rotation, and are of an indiscriminant value, not necessarily 01 0110 0011
↑
(7)

Therefore comparison takes place in descending bit order and appropriate corrective drive developed as required.

The magnitude of corrective drive will be only that of the bit under comparison so that the preceeding higher order bits will be stable and only the following descending bits will be altered but of no consequence because of continuing comparison and corrective drive in descending order.

As a result of this difference in the outputs of gates 15 and 17, the gate 24 opens and delivers an output which functions to open gate 27 and close gate 26. Closure of gate 26 inactivates the counter 18 as previously indicated. Opening of gate 27 provides an output which opens gate 30 and connects the clock generator 23 to the motor 29 which rotates the encoder 11 in a direction to decrease the output of gate 17 to the same value as that of the output of gate 15. When these two outputs are equal, gates 24, 27 and 30 close, and gate 26 opens as previously indicated.

The encoder 11 is a product of Librascope Corp., "Shaft Encoder (omega-Digital), Model No. 724, 0-20000 BCD Readout."

The clock generator 23 may be of various forms. As indicated by FIG. 2, it may consist of a relaxation oscillator with a limited output which functions through tubes 31 and 32, capacitor 33 and resistor 34 to produce a square wave output. Of course many other types of square wave generators may be utilized instead of the particular type illustrated.

The pulse motor 29 is available from various sources. The particular one utilized is designated as a "Bi Directional Stepping Motor" and is a product of Ledex Corp., Dayton, Ohio.

As will be apparent to those skilled in the art, the herein disclosed binary coded decimal system has the advantage that it permits resolution to least significant bit of data.

I claim:

1. In a device for positioning a shaft in accordance with a desired value of a coordinate having X decimal digits stored in the form of Y binary digits per decimal digit, the combination therewith of first and second groups of X times Y gates, said groups having pairs of corresponding gates, means for applying to the successive gates of said first group potentials representative of the successive binary digits of said coordinate, means coupled to said shaft for applying to successive gates of said second group successive ones of X times Y potentials each representative of a different rotational position of said shaft, a single gate having a pair of inputs connected to the outputs of the gates of said groups, means for successively opening said pairs of corresponding gates, a reversible motor coupled to said shaft and having input circuits for reversible operation, a pulse generator, and means operated by the output of said single gate to inactivate said gate opening means and to connect said generator to said motor selectably with one of said input circuits dependent on which gate of said opened pair of gates has the larger output.

2. In a device for positioning a shaft in accordance with a desired value of a coordinate having X decimal digits stored in the form of Y binary digits per decimal digit, the combination therewith of first and second groups of X times Y gates, said groups having pairs of corresponding gates, means for applying to the successive gates of said first group potentials representative of the successive binary digits of said coordinate, means coupled to said shaft for applying to successive gates of said second group successive ones of X times Y potentials each representative of a different rotational position of said shaft, a single gate having a pair of inputs connected to the outputs of the gates of said groups, means for generating intermittent pulses, a counter operated by said pulses to open said gate pairs one after the other, a reversible motor coupled to said shaft, and having input circuits for reversible operation, and gate means operated by the output of said single gate to inactivate said counter and to connect said pulse generating means to said motor selectably with one of said input circuits dependent on which gate of said opened pair of gates has the larger output.

3. A device according to claim 1 wherein said single gate is an "exclusive Or" gate and the remainder of said gates are "And" gates.

References Cited by the Examiner

UNITED STATES PATENTS

| | | | |
|---|---|---|---|
| 2,711,499 | 6/1955 | Lippel | 318—28 |
| 2,775,727 | 12/1956 | Kernahan | 318—28 |
| 2,792,545 | 5/1957 | Kamm | 318—28 |
| 2,900,620 | 8/1959 | Johnson | 340—146.2 |
| 2,907,877 | 10/1959 | Johnson | 340—146.2 |
| 2,909,789 | 10/1959 | Spaulding | 340—146.2 |

JOHN F. COUCH, *Primary Examiner.*